United States Patent Office

3,464,880
Patented Sept. 2, 1969

3,464,880
SURFACE CRYSTALLIZED GLASS AND
METHOD OF PRODUCING
Dale W. Rinehart, Natrona Heights, Pa., assignor to PPG
Industries, Inc., a corporation of Pennsylvania
No Drawing. Continuation of application Ser. No.
325,496, Nov. 21, 1963. This application May 6,
1968, Ser. No. 727,088
Int. Cl. B44f 1/00; C03c 17/00; B44d 1/20
U.S. Cl. 161—1                                    6 Claims

ABSTRACT OF THE DISCLOSURE

Surface crystallization of a lithia-alumina-silica glass by a surface nucleating agent during heat treatment whereby a compressive crystalline layer is formed thereon.

---

This application is a continuation of application Ser. No. 325,496 filed Nov. 21, 1963, now abandoned.

This invention is related to strengthened glass articles which are produced by heat treatment of crystallizable base glasses, and it is particularly related to transparent, surface crystallized, strengthened glasses. The crystals have a relatively low coefficient of thermal expansion compared to the base glass and upon cooling place the surface regions of the glass in high compressive stress.

For certain purposes, such as an increase in the mechanical strength of a glass body, it is desirable to provide it with a compressive stress in and parallel with its surface. One known method of accomplishing this is the procedure known as thermal tempering (air quenching), which comprises heating the glass body while avoiding devitrification and then rapidly cooling it from a temperature above the glass strain point to a tempreature below the glass strain point. The maximum mechanical strength or modulus of rupture of an abraded, thermally tempered glass article does not normally exceed about 12,000 to 16,000 pounds per square inch as compared to an abraded annealed glass article, the modulus of which is approximately 6,000 to 8,000 pounds per square inch.

Another known procedure for establishing higher compressive stresses in glass articles is by ion exchange. The ion exchange can be a high temperature ion exchange conducted at a temperature above the glass strain point using a smaller atomic diameter alkali metal than present in the base glass, e.g., the high temperature ionic migration of lithium from a molten salt bath into the surface of an alumina-silicate glass article containing sodium and/or potassium ions. The glass in the surface of the ion-exchanged glass article has a lower coefficient of thermal expansion than the glass in the interior, and the surface of the article is placed in compressive stress upon cooling of the article. It is also possible with specific glass compositions to produce crystals of beta-spodumene ($Li_2O \cdot Al_2O_3 \cdot 4SiO_2$) in the glass surface by this ion exchange treatment. This further reduces the coefficient of expansion and increases thesurface compressive stress in the glass. Such process is illustrated in U.S. Patent No. 2,779,136.

A low temperature ion exchange conducted at a temperature below the glass strain point results in a strengthened glass when the glass is dipped in a molten salt of a larger atomic diameter alkali metal than present in the base glass. For example, the low temperature ionic migration of potassium ions into a glass article containing lithium and/or sodium ions produces compressive stresses in the ion-exchanged regions.

Such ion exchange methods usually require the immersion of the glass articles into a bath of a molten alkali metal salt. Molten salt baths, especially alkali metal salt baths, are difficult and dangerous to deal with and maintain.

Another known method for strengthening glass is by crystallization. This involves the controlled heat treating of special lithia-alumina-silica glasses often referred to in the literature as a lithia-alumina-silica glass family. There are basically two known types of crystallization. One type requires the presence of the crystallization catalyst uniformly distributed throughout the glass composition and long heat treating schedules. This method of crystallization involves heat treatment to convert the glass throughout its thickness to a state of crystallization substantially uniformly dispersed in a glassy matrix. This method is illustrated in Belgian Patent No. 576,259. Strengthened glass articles resulting from such a crystallization strengthening procedure are not significantly stronger than ordinary annealed glass articles.

Another method of crystallization strengthening involves the carefully controlled heat treatment over long periods of time of certain lithia-alumina-silica glasses which may or may not contain a relatively small amount of a nucleating agent, such as $TiO_2$, distributed throughout the glass, to crystallize the surface portions only of the glass. Beta-eucryptite crystals ($Li_2O \cdot Al_2O \cdot 2SiO_2$), having a relatively low coefficient of thermal expansion are formed in the surface regions of the glass by suitable heat treatment. Upon cooling, the surface regions are in high compressive stress. Such a procedure is illustrated in U.S. Patent No. 2,998,675.

In the methods just described, crystal growth begins predominantly at the surface of the glass. The number of crystals which are formed is relatively small and the crystals become relatively large when the glass is heated for a time that is sufficient to obtain crystal growth to any appreciable depth. Depth of crystal growth is desired to obtain strengths which will not be unduly lowered by normal abrasion of the glass. These large crystals tend to scatter the light and impair the transparency of the glass.

The above described methods of surface crystallization strengthening of the special glasses require relatively high temperatures during treatment or long periods of heat treatment at lower temperatures. It is desired that a method be available to produce the surface crystals at lower temperatures in shorter times.

Another disadvantage to the special lithia-alumina-silica glasses is their high liquidus temperature. These glasses must be melted and formed at relatively high temperatures and are not suitable for use in conventional forming equipment. It is particularly desired that glasses having a lower liquidus temperature and characteristics suitable for surface crystallization strengthening be available for use in conventional flat glass forming equipment.

The present invention is an improvement in the field of strengthening glasses by surface crystallization. The invention allows the production of strengthened glass articles in greatly shortened time periods at lower temperatures, which articles have greatly improved transparency when compared with articles produced by known methods of crystallization strengthening. The improvements in transparency and reduction of the heat treating time required to attain surface crystallization constitute significant improvements achieved by ths invention.

According to the present invention, strengthened glass articles can be produced by coating the surface of a transparent crystallizable glass with a nucleating compound and heat treating the coated glass to effect surface crystallization while preserving transparency of the glass. For example, this may be done by depositing a film of titanium dioxide on the surface of the glass and thereafter heating the glass to develop crystals in its surface.

This results in an increase in the number of nucleation sites at the surface of the glass and an increase in the number of needle-like crystals which are grown inwardly from the surface in a given surface area. The crystals are smaller and are of such size that they do not tend to scatter light to an extent which interferes with the transparency of the glass. The diameter of the crystals along a plane which is parallel to the surface of the glass is of the order of 0.1 to 10 microns, preferably 0.1 to 3 microns, and even smaller. The crystals grow inwardly from the surface in a direction which is generally perpendicular to the surface for a distance or depth of at least about 10 and up to 50 to 100 or more microns, depending upon the temperature and length of time of heating. The growth of the crystals is time-temperature dependent, and the depth of growth can be controlled by increasing the time of heating and/or the temperature of heating to increase the crystal growth. The invention allows more efficient usage of and a higher concentration of the crystallization catalyst at the exact location where it is most needed, viz., at the glass surface which is to be crystallized.

Moreover, according to a preferred feature of this invention, a base glass to be strengthened has been provided which has a liquidus temperature-viscosity relationship favorable for producing glass articles (suitable for strengthening treatment) by conventional continuous production methods, such as conventional glass sheet drawing methods. These methods of production involve the use of much lower temperatures than can be employed to produce glass articles suitable for known surface crystallization strengthening, viz., where the glass is a special lithia-alumina-silica glass as mentioned above. Therefore, the present invention allows the production of surface crystallized strengthened glass articles suitable for use as viewing closures by commercially feasible production methods.

A preferred embodiment of the presention invention comprises coating lithia-alumina-magnesia-silica glass containing an alkali metal oxide such as sodium or potassium oxide with a titanium containing material capable of forming a titanium dioxide film upon heating, and heat treating the coated glass at a temperature which is sufficient to effect surface crystallization thereof. Usually the heat treating is conducted at temperatures ranging from 1300 to 1575° F. for time periods ranging from 5 to 30 minutes to grow surface crystallized zones ranging from 10 to 50 microns in thickness. Usually about 10 minutes heating is sufficient to grow crystals to a depth of 20 to 30 microns, which depth is sufficient to retain strength for normal abrasion. In general, as the alkali metal oxide content of the glass increases, the time and/or temperature necessary to form surface crystals decreases.

In its article aspect, the present invention is directed to strengthened glass articles comprising surface crystallized glass having a coating or film of a nucleating agent such as $TiO_2$ on its surface. The $TiO_2$ film also gives an unusual brilliance to the glass and enhances the surface reflectivity of the glass.

In the preferred embodiment of the invention, there is provided a lithia-alkali metal oxide-alumina-magnesia-silica base glass having a $TiO_2$ coating on its surface and having a crystalline surface zone in a state of compressive stress wherein the thermal expansion of said surface zone is lower than that of said base glass.

BASE GLASS COMPOSITION

Preferred crystallizable base glasses contain 54 to 65 weight percent $SiO_2$, 17 to 35 weight percent $Al_2O_3$, 3 to 9 weight percent $Li_2O$, 2 to 6 weight percent $MgO$ and 2 to 11 weight percent $Na_2O$ and/or $K_2O$, the total weight percent of $Na_2O$ and $K_2O$ being no more than about 11 weight percent when both $Na_2O$ and $K_2O$ are present.

The following base glass compositions are illustrative of crystallizable lithia-alkali metal oxide-alumina-magnesia-silica glasses which can be strengthened by surface crystallization in accordance with this invention. The weight percents of the various oxides are calculated from the corresponding batch charged to produce these glasses.

TABLE I.—PERCENT BY WEIGHT

| Component and property | A | B | C | D | E | F | G | H |
|---|---|---|---|---|---|---|---|---|
| $SiO_2$ | 58.79 | 57.58 | 56.68 | 55.76 | 54.55 | 55.76 | 55.16 | 55.76 |
| $Al_2O_3$ | 28.77 | 28.18 | 27.73 | 27.29 | 26.69 | 27.29 | 26.99 | 27.29 |
| $Li_2O$ | 5.45 | 5.34 | 5.25 | 5.17 | 5.60 | 5.17 | 5.11 | 5.17 |
| $MgO$ | 3.99 | 3.90 | 3.84 | 3.78 | 3.70 | 3.78 | 3.74 | 3.78 |
| $Na_2O$ | 3.00 | 5.00 | 6.50 | 8.00 | 10.00 | 4.50 | 5.50 | |
| $K_2O$ | | | | | | 3.50 | 3.50 | 8.00 |
| Liquidus temp. TL, (° F.) | 2,360 | 2,285 | 2,180 | 2,105 | 2,010 | 2,155 | 2,090 | 2,265 |
| Log viscosity at TL | 3.50 | 37.5 | 3.95 | 4.20 | 4.25 | 4.05 | 4.20 | 3.80 |

The above glass compositions are prepared by mixing, respectively, batches A to H given in parts by weight below (the parts by weight given yield 600 grams of base glass (slightly over one pound) having the above calculated compositions upon melting and fining).

TABLE II.—WEIGHT (GRAMS)

| Batch ingredient and melting schedule | A | B | C | D | E | F | G | H |
|---|---|---|---|---|---|---|---|---|
| Agate sand | 352.7 | 345.5 | 340.1 | 334.6 | 327.3 | 334.6 | 331.0 | 334.6 |
| Aluminum hydrate $Al_2O_3 \cdot (H_2O)_m$ | 265.9 | 260.4 | 256.2 | 252.2 | 246.6 | 252.2 | 249.4 | 252.2 |
| $Li_2CO_3$ | 81.5 | 79.9 | 78.5 | 77.3 | 75.7 | 77.3 | 76.4 | 77.3 |
| $MgCO_3$ | 50.1 | 49.0 | 48.2 | 47.5 | 46.4 | 47.5 | 46.9 | 47.5 |
| $Na_2CO_3$ | 30.8 | 51.3 | 66.7 | 82.1 | 102.6 | 46.2 | 56.5 | |
| $K_2CO_3$ | | | | | | 39.9 | 30.9 | 70.6 |
| Melting temp. (° F.) | 2,750 | 2,750 | 2,750 | 2,750 | 2,700 | 2,750 | 2,750 | 2,750 |
| Melting time (hours) | 25 | 22 | 22 | 15 | 18 | 20 | 20 | 20 |

The batch ingredients are thoroughly mixed and placed in a suitable melting receptacle, e.g., a platinum-rhodium alloy crucible containing 96.5 percent by weight of platinum and 3.5 percent by weight of rhodium. The batch ingredients are subjected to temperaures of 2650 to 2750° F. for a period of 15 to 25 hours, depending upon their respective high temperature viscosity level, to melt and fine the batch. The expression "melting time" as used herein refers to the total time period employed to melt and fine the batch materials. The batch materials are melted, quenched in water and remelted, following this sequence repeatedly in order to prepare uniform base glass compositions. The glasses are melted and fined in platinum crucibles.

After melting and fining, the glass and crucible are removed from the furnace and the glass is cast or drawn from the crucible as desired. The molten glass can be poured or cast upon a metal slab to form a slab or plate of unpolished glass. Thereafter, the plate is placed in a lehr and cooled (annealed) at a rate of about 1 to 5° F. per minute from a temperature near the upper end of the annealing range to a temperature about 100° F. below the strain point; annealing range and strain point having their classical definition as set forth in ASTM Designation C162-56. The annealed glass is then cooled more rapidly to room temperature. No crystallization occurs during this cooling. The glass is thereafter ground and polished preparatory to being coated and surface crystallized.

Instead of being cast as described above, the glass can be drawn upwardly from the crucible in the form of a sheet. This is done by inserting a platinum wire bait having a length of several inches into the melt and withdrawing the bait and glass upwardly to form the sheet. The glass is cooled more rapidly in this case with the result that some stress, i.e., 600 to 700 pounds per square inch, remains in the cooled sheet of glass. For example, the glass is cooled from a temperature in the melt of about 2350° F. to about 400° F. in the sheet in the atmosphere in a time of about 2 to 5 minutes. The sheet of glass is then cut to provide sections for coating and heat treating to develop surface crystals in the glass in accordance with this invention.

The batch materials for the above glasses, in addition to the above-mentioned materials, may comprise any materials, either oxides or other compounds, which, on being fused together during melting and fining, are converted to the desired oxide compositions in the desired proportions. Compounds such as petalite comprising 2 or more of the oxides of the final composition may be used in order to reduce the batch cost of the base glasses. Small amounts of a fining agent, e.g., $As_2O_3$, are usually employed to aid in fining the batch. The $As_2O_3$ is omitted in the above listing of components and ingredients for convenience because the residual amount normally remaining in the glass after fining is too small to have any effect on its fundamental properties.

Another series of transparent, surface crystallizable glasses having a viscosity-liquidus temperature relationship suitable for drawing or otherwise forming into flat glass products is a family of lithia-alumina-magnesia-silica glasses containing $P_2O_5$. This family of glasses consists essentially of 3 to 9 percent by weight of $Li_2O$, 17 to 35 percent by weight of $Al_2O_3$, 2 to 6 percent by weight of MgO, 54 to 65 percent by weight of $SiO_2$ and 1 to 11 percent by weight of $P_2O_5$. The addition of $P_2O_5$ to such glasses raises the viscosity at the liquidus temperature by simultaneously lowering the liquidus temperature and raising the viscosity level of the glass. Its effectiveness in this regard is shown in Table III for a series of glasses made by adding increasing amounts of $P_2O_5$ to a lithia-alumina-magnesia-silica base glass designated as "I" in the table. The weight percents of the various oxides are calculated from the corresponding batch charged to produce these glasses.

The above glass compositions are prepared by mixing, respectively, batches I to Q given in parts by weight in Table IV below to produce about 600 grams of glass.

TABLE IV.—WEIGHT (GRAMS)

| Batch ingredient | I | J | K | L | M | N | O | P | Q |
|---|---|---|---|---|---|---|---|---|---|
| Agate sand | 363.7 | 345.6 | 327.3 | 309.2 | 363.6 | 363.6 | 363.6 | 335.0 | 336.9 |
| $Al_2O_3 \cdot nH_2O$ | 269.3 | 254.8 | 242.3 | 228.9 | 223.8 | 196.7 | 160.5 | 202.9 | 249.5 |
| $Li_2CO_3$ | 83.5 | 79.2 | 75.0 | 71.0 | 83.4 | 83.4 | 83.4 | 84.2 | 77.3 |
| $MgCO_3$ | 51.6 | 49.1 | 46.7 | 44.1 | 51.6 | 51.6 | 51.6 | 47.8 | 47.7 |
| $NH_4H_2PO_4$ | | 48.6 | 97.2 | 145.8 | 48.6 | 77.8 | 97.2 | 99.6 | 47.4 |
| $H_3BO_3$ | | | | | | | | 23.3 | |
| $Na_2CO_3$ | | | | | | | | | 25.7 |

The batch ingredients are thoroughly mixed, placed in platinum alloy crucibles, melted and fined at 2750° F. for about 20 hours, cast or drawn, and cooled according to the procedures above with respect to the glasses set forth in Tables I and II.

Transparent, surface crystallized glasses can be produced according to the invention from the $P_2O_5$ containing family of glasses set forth above. However, when the composition is varied, haze may appear. For example, as the amount of $Al_2O_3$ is decreased, there is an increased tendency for haze to appear upon cooling of the glass. The addition of 5 percent by weight of $P_2O_5$ to a composition containing 29.66 percent by weight $Al_2O_3$ produces no haze. However, a glass containing 5 percent $P_2O_5$ and only 15.59 percent $Al_2O_3$ becomes hazy upon cooling. When $P_2O_5$ partially replaces $Al_2O_3$ in base glass I, no haze is observed until the amount of $P_2O_5$ exceeds 10 percent by weight. When the amount of $P_2O_5$ exceeds 10 percent, i.e. about 12 percent, the addition of more $Li_2O$ or another alkali metal oxide intensifies haze which tends to appear in the glasses. $B_2O_3$ and $Na_2O$ can be added in small amounts, i.e. up to about 3.5 percent by weight to serve as an aid in melting. Their addition causes further reduction in the liquidus temperature but does not appreciably raise the viscosity at the liquidus temperature.

The invention can be utilized with regard to other surface crystallizable glasses than those of Tables I to IV which are particularly useful in making flat glass products. The invention is also useful in the production of surface crystallizable glasses having compositions outside the ranges set forth above in the preferred embodiments of the invention. In general, the base glasses can contain as the essential ingredients 52 to 72 percent by weight $SiO_2$, 17 to 40 percent by weight of $Al_3O_3$ and 3 to 12 percent by weight of $Li_2O$, the weight ratio of $Li_2O/Al_2O_3$ being not more than 0.3/1. Other compatible metal oxides may also be present, provided that their total amount does not exceed about 15 percent by weight and that they do not alter the refractive index of the glass to such an extent that it does not properly match with the refractive index of the crystal and thereby seriously impair the transparency of the strengthened article. Such compatible metal oxides include the oxides of the metals of the second periodic group, PbO, $TiO_2$, $B_2O_3$, $Na_2O$ and $K_2O$. The $TiO_2$ content preferably should be less than about 2.5 percent by weight because its presence in significantly greater amount tends to promote crystallization throughout the entire mass. The $B_2O_3$ should not exceed about 5 percent by weight, the PbO should not exceed about 10 percent by weight and $Na_2O$ and/or $K_2O$ should not exceed about 11 percent by weight.

TABLE III.—PERCENT BY WEIGHT

| Component and property | I | J | K | L | M | N | O | P | Q |
|---|---|---|---|---|---|---|---|---|---|
| $SiO_2$ | 60.61 | 57.60 | 54.55 | 55.84 | 60.61 | 60.61 | 60.61 | 58.20 | 56.16 |
| $Al_2O_3$ | 29.66 | 28.18 | 26.69 | 22.35 | 24.66 | 21.66 | 19.66 | 20.80 | 27.48 |
| $Li_2O$ | 5.62 | 5.34 | 5.06 | 5.68 | 5.62 | 5.62 | 5.62 | 6.40 | 5.21 |
| MgO | 4.13 | 3.91 | 3.72 | 3.81 | 4.13 | 4.13 | 4.13 | 3.95 | 3.80 |
| $P_2O_5$ | | 5.0 | 10.0 | 10.24 | 5.0 | 8.0 | 10.0 | 7.68 | 4.87 |
| $B_2O_3$ | | | | 2.09 | | | | 2.97 | |
| $Na_2O$ | | | | | | | | | 2.5 |
| Liquidus temp. $T_L$ (° F.) | 2,500 | 2,415 | 2,365 | | 2,425 | 2,400 | 2,360 | 2,270 | 2,330 |
| Log viscosity at $T_L$ | 3.0 | 3.45 | 3.55 | | | 3.8 | 3.85 | 3.9 | |

SURFACE COATING, MATERIALS AND PROCEDURES

The melted, fined and formed base glass is provided with a surface film of $TiO_2$ by coating the surface thereof with a titanium containing material capable of forming a $TiO_2$ film upon heating. The $TiO_2$ film is formed during the heat treating step which serves also to effect surface crystallization. The temperatures employed to cause surface crystallization are sufficiently high to develop $TiO_2$ films.

In the case of organic titanium containing compounds or compositions, the heat treatment temperatures, being above the pyrolysis temperature of the organic titanium material, causes pyrolysis of the organic moieties to yield $TiO_2$. Air, or some other source of oxygen, is present during heat treatment to effect oxidation of the titanium containing material, whether inorganic or organic, to $TiO_2$.

The titanium containing material is one capable of forming $TiO_2$ upon heating at or below the temperatures employed in heat treating to cause surface crystallization, and can be organic, inorganic or a mixture of organic and inorganic titanium containing compounds and/or compositions. The titanium containing material can be a compound, e.g. an inorganic or organic titanium salt; or it can be a composition, e.g., a mixture of organic titanium salts, inorganic titanium salts, organic titanium salts and inorganic titanium salts, organic titanium containing polymers and/or resins, mechanical and chemical polyblends or organic titanium containing polymers and/or resins, etc.

The titanium containing material, whether organic or inorganic, should be one capable of forming a clear $TiO_2$ film essentially free from haziness upon heat treatment at or below the temperatures employed to effect surface crystallization, viz., temperatures ranging up to about 1250 to 1450° F. For example, when an organic titanium containing material is employed to form the $Ti_2O$ film, it should be "clean burning," viz., capable of pyrolysis at or below the heat treating temperatures without leaving a charry residue or scum which would create a substantial amount of haze (light scattering) or stain on the strengthened glass surface or otherwise substantially interfere with the transmittance of light and resolution of images through the $TiO_2$ coated, surface crystallized, strengthened, glass articles. The $TiO_2$ films are reflective and are preferably thin enough to be colorless, i.e. of the order of 0.001 to 0.05 micron in thickness, although thicker films are useful in the practice of the invention. The $TiO_2$ films are capable of reflecting about 5 to 30 of incident light.

Care should be exercised to conduct the application of the $TiO_2$ coating solution to the glass in atmospheres essentially free from moisture as the presence of a large moisture content tends to result in haziness in the surface crystallized zone. In order to avoid this, the moisture content should usually be kept below 40 percent relative humidity, and preferably below 25 percent relative humidity, during application of the coating solution.

Suitable organic titanium containing materials which can be employed in the practice of this invention include, but are not limited to such materials as: mono-, di-, tri-, and tetra-alkyl titanates and orthotitanates where the alkyl substituents contain from 1 to 8 carbon atoms as well as polymers of these titanates and orthotitanates, e.g., tetra isopropyl orthotitanate, tetra-n.butyl orthotitanate, homopolymers and copolymers containing tetra-n.butyl orthotitanate as the sole monomeric component or one of the monomeric components, the other monomeric component (or components) being a different alkyl titanate or orthotitanate. The alkyl titanates and polymeric alkyl titanates can be any of those disclosed in the patents to Boyd et al. 2,710,267, Haslam 2,768,909 and Deyrup 2,831,780.

As suitable inorganic titanium containing materials, the following can be listed as exemplary: Titanium halide and mixed halide salts, e.g., $TiCl_4$, $TiBr_4$, $TiI_4$, $TiCl_2Br_2$, $TiCl_2I_2$, etc.

As between organic and inorganic titanium containing materials, the organic titanium containing materials are preferred, with the alkyl titanates and orthotitanates and polymers thereof being the preferred classes or organic titanium containing materials.

The coating operation can be conducted conveniently by forming a solution, dispersion, etc., of the titanium containing compound or composition and dipping or immersing the base glass article therein to coat the glass with a film of the titanium compound or composition or by spraying the solution on the glass. The carrier (solvent or dispersion medium) for coating can be selected from a wide variety of materials, i.e. organic solvents such as methanol, ethanol, propanol, etc., in accordance with known methods of providing coatings of the given titanium compound or composition.

Preferably, the coating solution contains a small amount, e.g. from 0.01 to 2 percent by weight of a soluble iron salt, e.g. $FeCl_2$, $FeCl_3$, $FeSO_4$, etc., which can be in pure or hydrated form, e.g. $FeCl_2 \cdot 4H_2O$. The inclusion of the iron salt, especially $FeCl_2 \cdot 4H_2O$, allows the attainment of smaller, more uniform surface crystals than when the titanium coating solution contains no iron salt. The presence of the iron salt also yields a better optical surface by eliminating or reducing to an unobjectable level any haze which might tend to occur.

The weight concentration of the titanium containing compound or composition in the coating solution or dispersion can range from about 0.01 or even lower to about 5 percent by weight and even higher. Usually the weight concentration of the titanium compound or composition ranges between 0.1 to 2.0 weight percent based on total coating solution or dispersion. This permits the formation of a relatively thin, colorless, transparent coating on the glass.

Usually the coating procedure is conducted at ambient room temperatures, viz., 65° to 75° F. but lower or higher temperatures can be used. The humidity level of the atmosphere in which the coating is conducted should be controlled below 40 percent relative humidity for coating operations conducted at temperatures between 65° and 75° F.

HEAT TREATMENT

The heat treatment can be performed as soon as the coating step has been completed, and the film of titanium containing material has dried on the glass. As mentioned previously, the heat treating operation serves to both thermally develop the $TiO_2$ film and surface crystallize the base glass composition. Usually the heat treatment is performed at temperatures of from about 100° F. to about 200° F. below the softening point of the base glass being strengthened.

The invention is illustrated in greater detail in the examples which follow:

Example I

Glass rods of 1.5 to 2 millimeters diameter were formed by being drawn from a melt of glass D of Table I. These rods were dipped in a solution composed of 0.9 cubic centimeters of tetra-n-butyl orthotitanate, 200 milligrams $FeCl_2 \cdot 4H_2O$ and 120 cubic centimeters of methanol and removed immediately. The coated rods were heated for 10 minutes at a temperature of about 1380° F. and a crystalline layer extending about 25 microns in from the surface of the rod was formed in each case. The rods were transparent and had a thin, lustrous iron containing film of $TiO_2$ on their surfaces.

The rods were strength tested by first abrading them with No. 180 Aloxite Cloth. The rods were rotated in the cloth by hand for several minutes. The strength of an abraded rod was determined by gradually loading a rod of 2¾ inches length mounted horizontally at points spaced 2 inches from each other on the under side of the rod. The force necessary to break the rod was applied centrally on the top side of the rod at points spaced ½ inch from each other. The average breaking strength of 6 abraded rods was 103,800 pounds per square inch. The average, abraded, bending strength of 4 uncrystallized rods was 11,900 pounds per square inch.

Example II

Glass rods of 2 millimeter diameter were formed by being drawn from a melt of glass F of Table I. These rods were dipped in the solution described in Example I and thereafter heated for 10 minutes at 1475° F. The average, abraded, bending strength of 5 rods tested as in Example I was 110,700 pounds per square inch. The average, abraded, bending strength of 3 uncrystallized rods was 11,970 pounds per square inch.

Example III

Glass rods of 2 millimeter diameter were formed by being drawn from a melt of glass B of Table I. These rods were dipped in a solution composed of 0.4 cubic centimeter tetra-n-butyl orthotitanate in 200 cubic centimeters of methanol and thereafter heated for 10 minutes at 1500° F. The average, abraded, bending strength of 4 rods was 100,800 pounds per square inch. The average non-abraded, bending strength of 4 rods was 112,500 pounds per square inch.

Example IV

Glass rods of 1.5 to 2.0 millimeter diameter were formed by being drawn from a melt of a glass having the same composition as glass B with the exception that the $Na_2O$ content was substituted for by 5% by weight of $K_2O$. These rods were dipped in the same solution as used in Example III and thereafter heat treated for 10 minutes at 1550° F. The glass rods had an average, abraded, bending strength of 111,700 pounds per square inch.

Example V

Glass L of Table III was formed in rods 1.5 millimeters in diameter and as ground and polished plates 3 inches by 3 inches by 0.256 inch. The rods and plates were dipped in a solution composed of 0.2 cubic centimeter of tetra-n-butyl orthotitanate and 100 cubic centimeters of methanol and then heated for 10 minutes at 1525° F. The rods had an average, abraded, bending strength of 107,000 pounds per square inch. The plates were tested in unabraded form by a concentric ring test (2 inch and 1 inch rings) and had an average unabraded strength of 60,000 pounds per square inch.

Example VI

Glass P of Table III was formed into ground and polished plates 3 inches by 3 inches by 0.254 inch. The plates were dipped in the same solution as used in Example V and heated for 10 minutes at 1425° F. The plates had an average, unabraded tensile strength of 71,000 pounds per square inch when tested by the concentric ring test utilized in Example V.

Examples I to VI illustrate the best mode of carrying out the invention as contemplated by the inventor, but the scope of the invention should not be considered as limited to the specific details set forth in these examples. The use of $TiO_2$ as the nucleating film is exemplary, but the invention in its broadest aspect is not limited to the use of $TiO_2$ as the nucleating agent. Films of other materials capable of nucleating the crystallization at the surface of a surface crystallizable glass can be used.

The following example illustrates the use of a silver containing film as a nucleating film.

Example VII

Rods of glass I of Table III were formed having a diameter of about 2 millimeters. These rods were coated with a slurry composed of 8 cubic centimeters of methanol and 10 grams of a commercial silver staining compound composed of silver chloride, copper sulfate and ochre sold as No. 24259 by the O. Hommel Company. A coating of about 0.15 millimeter thickness was produced on the rods.

The coated rods were heated at 1200° F. for 1 hour and then cooled to room temperature. The coating was removed by washing with water. No discoloration (or coloration) of the surface was observed to result from this treatment, but the presence of silver atoms and possibly copper atoms or ions was shown by strong orange fluorescence under ultraviolet light. This thermal treatment does not cause any appreciable crystallization, but it does permit a later crystallization heat treatment to be conducted at lower temperatures than normally required to crystallize the same glass.

Evidence of the effect of the silver pretreatment on the surface crystallization of rods of glass I is shown in the strength data in the Table V below. Two sets of data were compiled with the treatment conditions being the same with the exception that the pretreatment in one set of data did not include the application of the silver staining coating; whereas the silver staining coating was included in the other pretreatment.

TABLE V

| Pretreatment | Crystallization treatment | No. rods | Average modulus of rupture (unabraded), pounds per sq. inch |
|---|---|---|---|
| A. No silver stain: | | | |
| 1 hr., 1,200° F_ _ | 30 min., 1,450° F_ _ | 11 | 45,400 |
| 1 hr., 1,200° F_ _ | 30 min., 1,500° F_ _ | 9 | 41,000 |
| 1 hr., 1,200° F_ _ | 30 min., 1,550° F_ _ | 10 | 53,400 |
| 1 hr., 1,200° F_ _ | 30 min., 1,600° F_ _ | 9 | 107,200 |
| 1 hr., 1,200° F_ _ | 30 min., 1,650° F_ _ | 9 | 123,700 |
| B. silver stain: | | | |
| 1 hr., 1,200° F_ _ | 30 min., 1,450° F_ _ | 10 | 61,000 |
| 1 hr., 1,200° F_ _ | 30 min., 1,500° F_ _ | 11 | 113,100 |
| 1 hr., 1,200° F_ _ | 30 min., 1,550° F_ _ | 22 | 141,800 |
| 1 hr., 1,200° F_ _ | 30 min., 1,600° F_ _ | 9 | 146,200 |
| 1 hr., 1,200° F_ _ | 30 min., 1,650° F_ _ | 9 | 144,700 |

Treatment with the silver stain is shown to be responsible for shifting to lower values the crystallization temperature at which high strengths are first observed. This is probably a result of the earlier crystal development resulting from this treatment and is probably influenced also by greater layer continuity. The stain treatment was also responsible for increasing the maximum attainable strength by about 20 percent or more. It has been noted by microscopic inspection (Haberland) that the degree of crystal orientation appears to be less when nucleated in this manner. The higher strength level could thus result from a decreased thermal expansion for the crystalline layer as more random orientation is approached in the crystal arrangement. More uniform crystallization over the surface could also be a contributing factor.

It is to be pointed out that although it is possible to achieve higher strengths at lower crystallization temperatures with a surface treatment of the type described, it does not follow that protection of strength against abrasion, as a function of crystallization temperature, is increased. Protection of strength against abrasion depends upon the depth of penetration of the crystalline layer, which does not appear to be appreciably accelerated by the staining treatments carried out. The effect of such treatment probably extends no more than several microns beneath the surface. Beyond this the layer front would be expected to move at the usual rate.

Example VIII

Glass I of Table III was formed into ground and polished plates. Some of these plates were pretreated with the silver composition described in Example VII and some were not. All of the plates were heated at 1500° F. for 30 minutes. There was no microscopic evidence (Haberland) of crystals forming on the plates not pretreated with the silver composition; whereas the silver pretreated plates developed a layer of small crystals which appeared to be fairly continuous. This further indicates that the nucleating silver film caused surface crystallization to occur at a lower temperature.

I claim:

1. A method of forming a transparent strengthened glass article having a compression layer contiguous with the surface of said article and a tension layer beneath said compression layer, comprising forming a coating of a crystal nucleating agent on a base of a crystallizable glass of the lithia-alumina-silica glass family wherein crystals form having a lower coefficient of thermal expansion than said glass upon crystallizing, heating said glass up to a temperature not above about 100° F. below the softening point of the glass until a layer of crystals is formed at said glass surface and in a region subjacent thereto, and thereafter cooling said glass to place the crystal layer in compression.

2. A method of strengthening a surface crystallizable glass base of a glass of the lithia-alumina silica glass family which forms crystals having a lower coefficient of thermal expansion than said glass base, comprising (1) contacting the glass with a titanium compound, (2) heating the glass to an elevated temperature not above about 100° F. below the softening point of the glass until said titanium compound is converted to a titanium dioxide film and a layer of crystals at the surface of the glass and in a region subjacent thereto develops, and thereafter cooling said glass to place the crystal layer in compression.

3. A strengthened, transparent glass article prepared by the process of claim 1.

4. The method of claim 1 wherein the nucleating agent is $TiO_2$.

5. The method of claim 1 wherein the glass consists essentially in percent by weight of 52 to 72 percent $SiO_2$, 17 to 40 percent $Al_2O_3$, and 3 to 12 percent $Li_2O$, the weight ratio of $Li_2O$ to $Al_2O_3$ being not more than 0.3 to 1.

6. The method of claim 1 wherein the nucleating agent is silver.

References Cited
UNITED STATES PATENTS

| | | | |
|---|---|---|---|
| 2,768,909 | 10/1956 | Haslam | 65—60 |
| 2,831,780 | 4/1958 | Deyrup. | |
| 2,998,675 | 9/1961 | Olcutt et al. | 65—33 |
| 3,241,985 | 3/1966 | Kuwayama | 65—33 |
| 3,253,975 | 5/1966 | Olcutt et al. | 161—1 |
| 2,971,853 | 2/1961 | Stookey | 65—33 XR |
| 2,663,658 | 12/1953 | Schurect | 65—33 |
| 2,904,449 | 9/1959 | Bradstreet | 65—33 XR |
| 3,019,497 | 2/1962 | Horton et al. | 65—33 XR |
| 3,063,788 | 11/1962 | Veazie | 65—30 XR |
| 3,166,396 | 1/1965 | Miller et al. | 65—33 XR |
| 3,266,912 | 8/1966 | Murphy | 65—33 XR |

OTHER REFERENCES

Booth et al.: "Surface Nucleation and Crystal Orientation in Lithium Silicate Glass Fibers," J. of the American Cer. Soc., vol. 47, No. 1, pp. 25–29, May 1, 1963.

Thakur: "Nucleation and Controlled Crystallization of Glass," Central Glass and Cer. Res. Inst. Bul. India, vol. 10, No. 2, June 1963, pp. 55–57.

S. LEON BASHORE, Primary Examiner

F. W. MIGA, Assistant Examiner

U.S. Cl. X.R.

65—30, 60, 32, 33; 106—39, 52; 117—12, 43, 54